United States Patent [19]

Tamai et al.

[11] 4,429,315

[45] Jan. 31, 1984

[54] MULTI-NOZZLE INK JET PRINTER

[75] Inventors: Masayoshi Tamai; Tetsuo Iyoda, both of Ebina, Japan

[73] Assignee: Fuji Xerox Co., Ltd., Kanagawa, Japan

[21] Appl. No.: 361,026

[22] Filed: Mar. 23, 1982

[30] Foreign Application Priority Data

Mar. 24, 1981 [JP] Japan .................................. 56-41693
Oct. 4, 1981 [JP] Japan ................................ 56-162766

[51] Int. Cl.[3] .............................................. G01D 15/18
[52] U.S. Cl. ........................................................ 346/75
[58] Field of Search ........................... 346/1.1, 75, 140

[56] References Cited

U.S. PATENT DOCUMENTS

| | | | |
|---|---|---|---|
| 3,739,395 | 6/1973 | King | 346/75 |
| 4,059,183 | 11/1977 | Hoskins | 346/75 X |
| 4,084,195 | 4/1978 | Pereira | 346/75 X |
| 4,167,741 | 9/1979 | Heard et al. | 346/75 |
| 4,249,187 | 2/1981 | Erikson et al. | 346/75 |
| 4,364,060 | 12/1982 | Jinnai et al. | 346/75 |

*Primary Examiner*—Donald A. Griffin
*Attorney, Agent, or Firm*—Sughrue, Mion, Zinn, Macpeak, and Seas

[57] ABSTRACT

An ink jet printer of the deflection type is provided in a multi-nozzle configuration to enable an increase in printing speed. A single character to be printed is proportionately divided into portions which are printed independently by the nozzles so that different portions of a character may be simultaneously formed.

6 Claims, 6 Drawing Figures

MULTI-NOZZLE INK JET PRINTER

BACKGROUND OF THE INVENTION

This invention relates to a charge control type ink jet printer in which ink droplets jetted from a nozzle are charged and deflected to print figures.

Charge control ink jet systems can be roughly classified into two types; binary deflection type ink jet systems in which charging is effected in binary levels, and nozzles are provided in correspondence to picture elements forming a character to be printed, and analog deflection type ink jet systems in which ink droplets from a single nozzle are charged in about seven to thirty levels and are deflected according to those levels. The binary deflection ink jet system is advantageous in that the printing speed increases with the number of nozzles; however, it is disadvantageous in that, as the density of picture elements is increased, the clearances between the jets and the charging electrodes are decreased, which makes it difficult to obtain positional alignment. On the other hand, the analog deflection type ink jet system is free from the drawback described above, because the dimension of the charging electrode is not limited by the density of picture elements; however, its printing speed is low: with a serial printer for printing a character consisting of 30×30 picture elements, the printing speed is fifty characters per second.

SUMMARY OF THE INVENTION

This invention is intended to increase the printing speed, which is a drawback accompanying the analog deflection type ink jet printer. To achieve the object, the analog deflection type ink jet printer is improved so that one printer head has a number of nozzles, ink droplets from the nozzles are deflected substantially perpendicularly to the direction in which the nozzles are arranged, printing spots in plural levels are formed by each nozzle, and picture elements printed by each nozzle are combined together to form a print or character.

BRIEF DESCRIPTION OF THE DRAWINGS

FIG. 4(*b*) is an explanatory diagram showing the positions of the nozzles; and FIG. 5 is a coordinate system indicating the positions of printed picture elements according to a second embodiment of this invention.

DETAILED DESCRIPTION OF THE PREFERRED EMBODIMENTS

Figure 2:
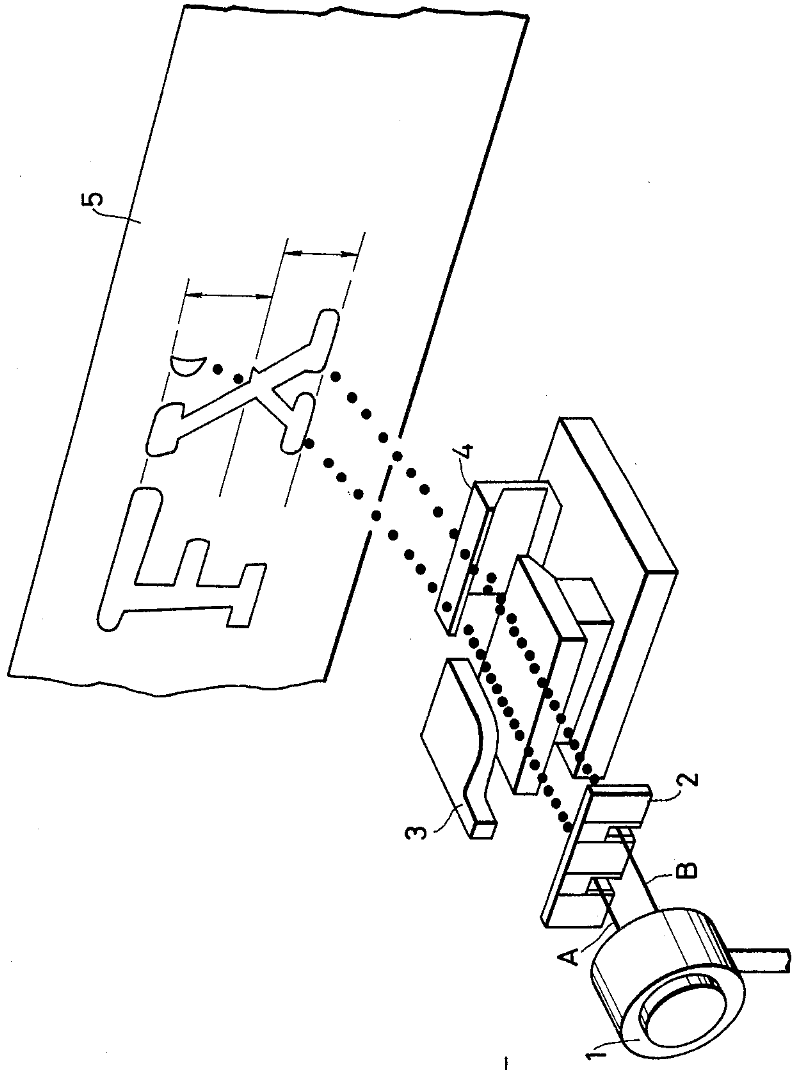
FIG. 2 is a perspective view of a multi-nozzle ink jet printer using a multi-nozzle printing head according to one embodiment of this invention.
Figure 1:
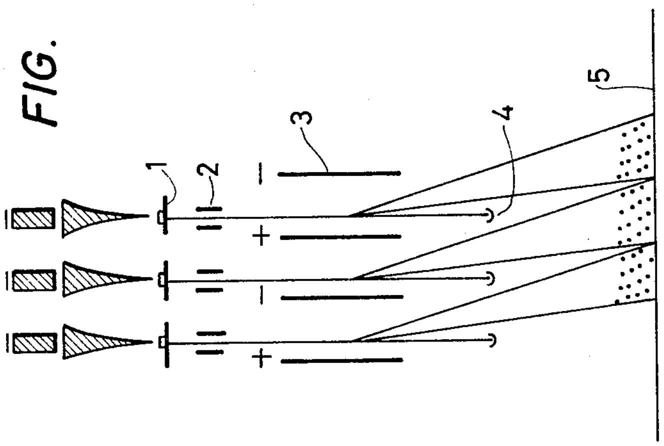
FIG. 1 is an explanatory diagram illustrating the printing operation of a conventional binary deflection type multi-nozzle printing head.

As shown in FIG. 2, the ink flows jetted by nozzles A and B of a single head 1 are formed into regular ink droplets by a charging electrode 2, and the ink droplets thus formed are charged by the charging electrode 2 according to recording data. Each ink droplet is deflected according to the amount of charge applied thereto while passing through a deflecting electric field which is formed by a deflecting electrode 3, so that printing is performed by the nozzles A and B, which share printing positions on the recording sheet 5. The ink droplets which are not used for printing are collected and recovered by a gutter 4.

That is, in the invention, a single head 1 has a plurality of nozzles (two nozzles in the above-described embodiment), and a figure to be printed (not limited to characters) is divided into parts, the number of which is equal to the number of nozzles, so that the nozzles form the respective parts simultaneously, to obtain prints of plural bits.

The operation of the printer of the invention will now be described.

In the printer of the invention, one head has a plurality of nozzles, as was described above. Therefore, the time required for printing can be reduced to 1/n of the time required in the case where a head is provided with only one nozzle (where n is the number of nozzles in one head). In other words, the printing speed may be substantially increased in inverse proportion to the reciprocal of the number of nozzles.

In the invention, the nozzles are arranged spaced an integer number times a printing picture interval (n×p).

Figure 4A:
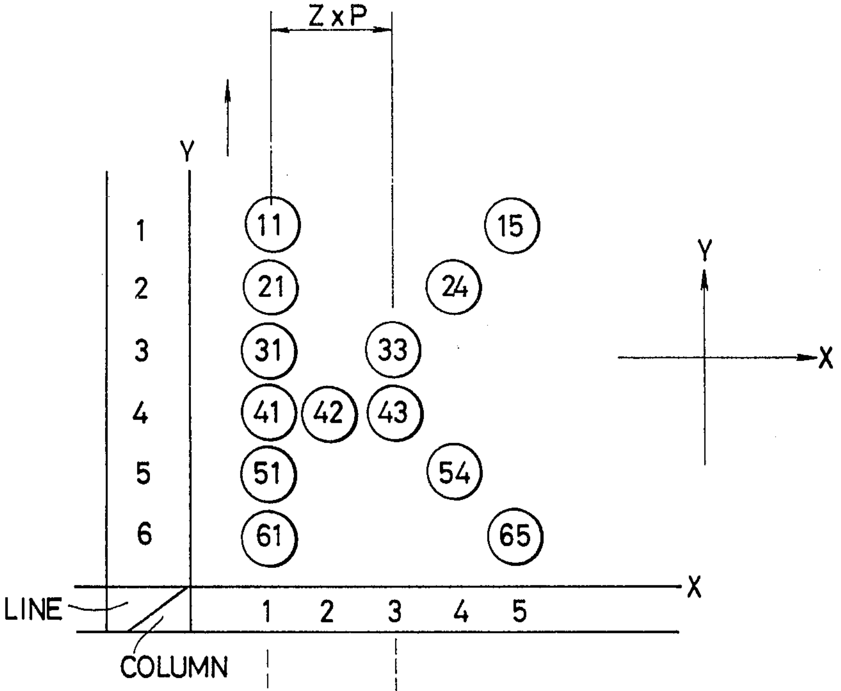
FIG. 4(*a*) is a coordinate system indicating the positions of printed picture elements.
Figure 4B:
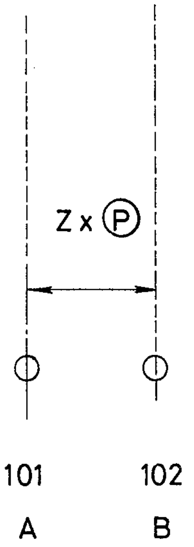

One example of the operation of the printer according to the invention will be described with reference to the case where the technical concept of the invention is applied to a moving carriage type serial printer. FIG. 4(*a*) shows the character "K", consisting of (5×6) picture elements (five picture elements horizontally and six picture elements vertically). In FIG. 4(*a*), reference character X designates a print head movement direction, and Y, a recording sheet movement direction. Each picture element will be represented by two digits which indicate the line and column thereof in the 5×6 matrix. FIG. 4(*b*) shows the arrangement of the nozzles of the print head. The distance between the nozzles is equal to twice the distance between two adjacent picture elements (=2×p) in the line or X direction in FIG. 4(*a*). In FIG. 4(*b*), the right and left nozzles will be referred to as nozzles B and A, respectively.

Printing is carried out as described below. Among the six lines, the printing of the upper three lines is carried out by the nozzle A, and the printing of the lower three lines is carried out by the nozzle B. Two columns are printed simultaneously, but it should be noted that the two columns are spaced by twice the picture element interval (2×p) from each other. Picture elements are printed by the nozzles A and B with timing 1, 2, 3, . . . and so on, synchronous with formation of ink droplets.

In printing the character in FIG. 4(*a*), among the six lines, the picture elements on the first through third lines are printed by the nozzle A, and the picture elements on the fourth through six lines are printed by the nozzle B. When the nozzle A is on the first column, the nozzle B is on the third column. The movement of an ink droplet in the direction of the rows is controlled by the control electrode, and the movement in the direction of the columns is effected by moving the nozzles.

In FIG. 4(*a*), as mentioned above, each picture element is represented by a circle including two digits such as ⑪: the left digit represents a row or line number, and the right digit represents the column number.

The picture elements forming the character "K" in FIG. 4(*a*) are printed in the order partially shown in the following Table 1:

TABLE 1

| Timing | Nozzle A | Nozzle B |
|---|---|---|
| 1 | 11 | 43 |
| 2 | 21 | |
| 3 | 31 | |
| 4 | | |
| 5 | | 54 |
| 6 | | |
| 7 | | |
| 8 | | |
| 9 | 33 | 65 |
| 10 | | |
| . | | |
| . | | |
| . | | |

For instance, with timing 1, the nozzle A prints the picture element 11, while the nozzle B prints the picture element 43. Next, with timing 2, the nozzle A prints the picture element 21, but the nozzle B prints no picture element (the picture element would be represented by the two digits "53") because the character "K" does not include the picture element 53, and therefore this ink droplet is collected by the gutter 4. With timing 3, the nozzle A prints the picture element 31, while the nozzle B prints no picture element.

Next, the head 1 is moved by one bit in the line direction at timing 4, and since the character "K" does not include a picture element to be printed at the positions "12" or "44" by either of the nozzles A and B, the ink droplets from the nozzles drop into the gutter 4.

For convenience in the above description, the printing operation of the nozzle A began with the picture element 11; however, it sould be noted that the picture elements 41, etc. were printed by nozzle B with the timing which occurred two columns before.

Figure 3:
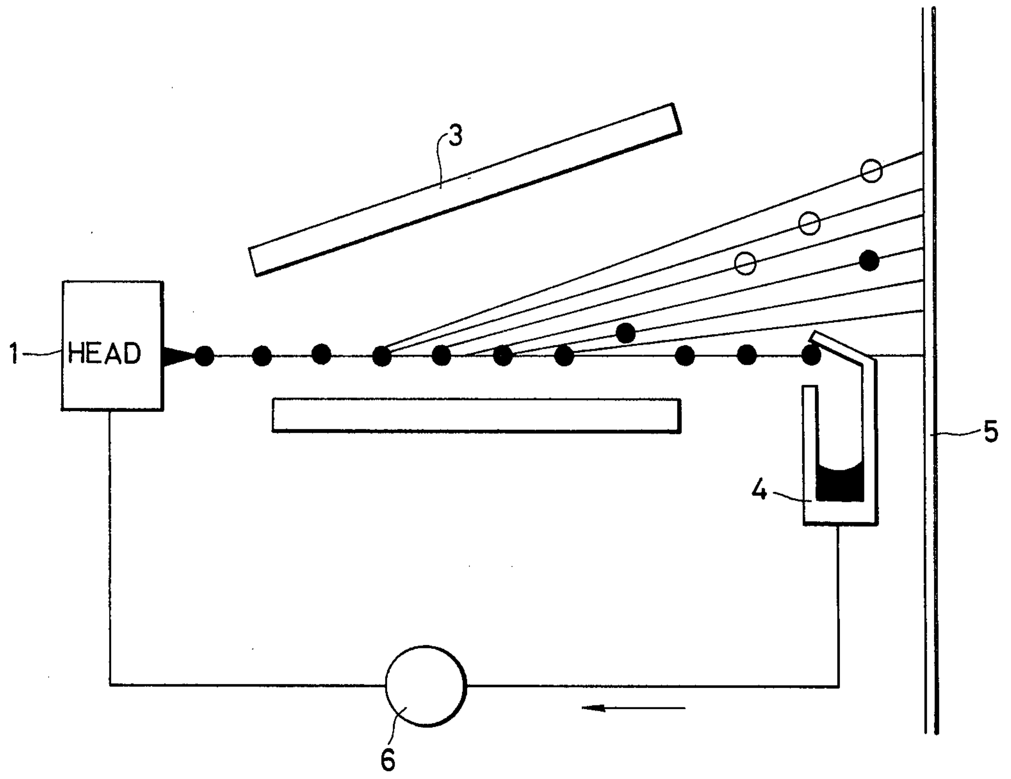
FIG. 3 is a schematic diagram showing ink droplet flying paths as viewed in the direction in which the nozzles are arranged.
Figure 3:
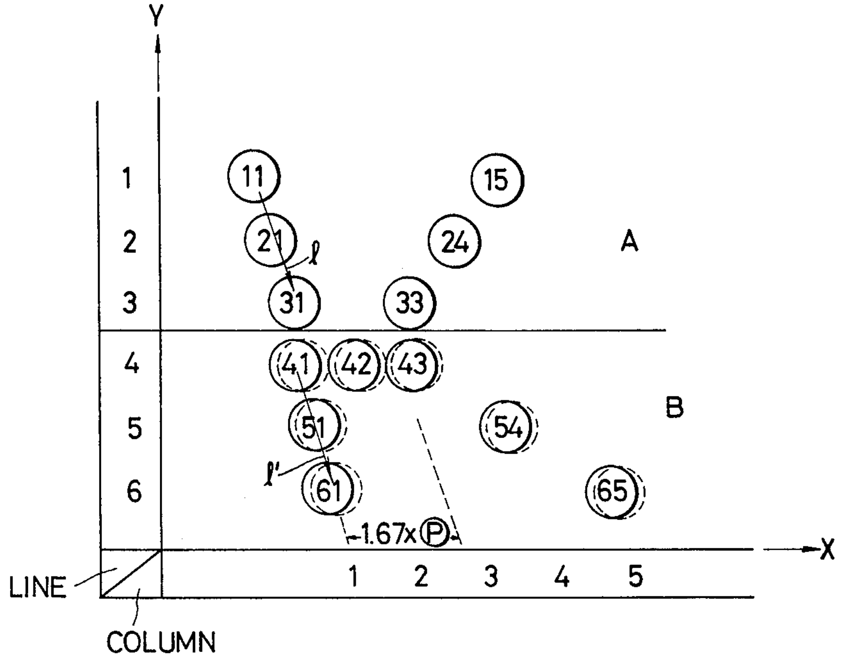

The deflection of ink droplets, as viewed in the direction of movement of the print head, is as shown in FIG. 3. An ink drop forming unit, i.e.. the print head 1 has two nozzles which are arranged perpendicularly to a recording sheet 5, and accordingly two streams of ink are formed, but only one ink flow is shown because the two droplet streams overlap each other in FIG. 3. For clarification in illustration, the charging electrode is not shown in FIG. 3. In FIG. 3, the ink droplets immediately in front of the recording sheet 5 correspond to timing 1. The ink droplets from the nozzle A are indicated by small white circles, and those from the nozzle B by small black circles. For convenience in illustration, the loci or traces of the flying ink droplets are indicated by straight lines, for everyrow or line.

In practice, the nozzles should be sufficiently spaced from one other so as to minimize the mutual action between flying charged ink droplets. In the case of an ink jet printer which prints a character of $32\times32$ picture elements with the distance between adjacent picture elements being 0.1 mm in the line direction, the distance between the nozzles may correspond to twenty picture elements ($n=20$), for instance. Ink flowing from the nozzle at a rate of 20 m/sec provides about $10^5$ ink droplets per second. Accordingly, a print head with two nozzles provides about $2\times10^5$ ink droplets per second, and the printing speed thereof is 100 characters per second. While this embodiment has been described with reference to the case where the head has two nozzles, the invention is not limited thereto or thereby.

In the deflection system referred to above, since the ink droplets are charged with the same polarity and are close to each other, repulsive forces are generated, as mentioned above, between the columns of the ink droplets produced from each of the nozzles. The ink droplets thus may be diverted by the repulsive force to result in printing distortion. The maximum deflection is of course imparted to the ink droplets having the greatest charge. The embodiment explained above thus still has a deficiency in that the highest charging voltage is reached simultaneously for each of the nozzles and thus the ink droplets of the greatest charge are closely spaced, to produce the maximum deflection.

The inventors have made a further study and found that the foregoing defect can be significantly decreased by merely displacing the timings at which the charging voltage arrives at the maximum from one other, so as not be coincide. A second embodiment of the invention thus provides a multi-nozzle ink jet printer of the analog deflection type in which a plurality of printing nozzles are provided and are disposed in the moving direction of the carriage to obtain a plurality of printing bits simultaneously, which is charactered by displacing the timing at which the droplets of the maximum charge are produced from each of the nozzles so as not to coincide. Additionally, by slanting the deflection electric field formed by the deflection electrode relative to the direction perpendicular to the moving direction of the printing head, satisfactory picture images with no printing distortion at high printing speed can be obtained.

Referring now to the case where the timing is displaced by one timing interval, the nozzle B prints the picture element (43) while the nozzle A prints element (21) in FIG. 5 in order to displace the timing for the highest charging, as shown in Table 2. In this embodiment, one bit nozzle movement occurs in the direction X during three bit driving in the vertical direction. Thus, element (43), driven simultaneously with (21), is printed at a position displaced rightwardly by ⅓ bit (shown by dotted line). Such displacement is caused since (43), which would otherwise be driven simultaneously with (11), is instead driven at the next timing interval for element (21). Accordingly, such displacement can be compensated by bringing the position of the nozzle B closer to the nozzle A by ⅓ bit. Since the timing is the same for all of the succeeding printings, all of the displacements in the subsequent printing can be compensated.

TABLE 2

| Timing | Nozzle A | Nozzle B |
|---|---|---|
| 1 | 11 | |
| 2 | 21 | 43 |
| 3 | 31 | |
| 4 | | |
| 5 | | |
| 6 | | 54 |
| 7 | | |
| 8 | | |
| 9 | 33 | |
| 10 | | 65 |

Since the printer head moves in the direction X, scanning lines l, l' of the nozzles A, B are slanted downwardly to the right to form picture images somewhat skewed downwardly and to the right relative to the original images as shown in FIG. 5, although this has not been shown in FIG. 3 for the sake of simplicity of explanation. However, a slant of such an extent causes no substantial problems.

If it is desired to obtain images of higher accuracy, the skew may be compensated by slanting the electric field that deflects the droplets jetted out of the nozzles orthogonally in the forward direction relative to the moving direction of the carriage, correcting the printing head so that the straight line connecting a plurality of nozzles is slanted relative to the moving direction thereof instead of slanting the electric field, or by slanting both the electric field and the printing head.

What is claimed is:

1. An analog deflection type ink jet printer, comprising;

a printer head having a plurality of printing nozzles, said nozzles being horizontally aligned and spaced from one another by a predetermined distance, said distance being equal to an integer multiple of a distance between adjacent bits of a character to be printed, said nozzles operating simultaneousiy whereby a plurality of printed bits are simultaneously produced to print said character.

2. An ink jet printer of the analog deflection type comprising; a printing head having a plurality of printing nozzles, said plurality of printing nozzles being aligned and disposed in the moving direction of a carriage and horizontally spaced from each other, said nozzles being simultaneously operable so as to produce a plurality of printing bits simultaneously to print a character, wherein the timing of the jetting from said nozzles of droplets having a maximum charge is adapted so as not to coincide.

3. The multi-nozzle ink jet printer of claim 2, wherein the electric field for deflecting the droplets jetted from said plurality of printing nozzles is slanted orthogonally in the forward direction relative to the moving direction of the carriage.

4. The multi-nozzle ink jet printer of claim 2, wherein the printer head is adapted such that a straight line connecting the plurality of nozzles is slanted relative to the moving direction of the carriage.

5. The multi-nozzle ink jet printer of claim 2, wherein said electric field is slanted orthogonally in the forward direction relative to the moving direction of the carriage, and said printer head is adapted such that a straight line connecting the plurality of nozzles is slanted relative to the moving direction of the carriage.

6. The multi-nozzle ink jet printer of claim 2, wherein said nozzles are spaced from each other by an integer multiple of the distance between adjacent character bits, less a correction factor due to the movement of the head during printing.

* * * * *